United States Patent
Hicks et al.

(10) Patent No.: US 10,873,752 B2
(45) Date of Patent: Dec. 22, 2020

(54) ADAPTIVE CAMERA RESOLUTION FOR COMPRESSION MATCHING

(71) Applicant: Intel Corporation, Santa Clara, CA (US)

(72) Inventors: Richmond Hicks, Beaverton, OR (US); Jill M. Boyce, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 872 days.

(21) Appl. No.: 15/258,761

(22) Filed: Sep. 7, 2016

(65) Prior Publication Data

US 2017/0332089 A1 Nov. 16, 2017

Related U.S. Application Data

(60) Provisional application No. 62/334,836, filed on May 11, 2016.

(51) Int. Cl.

| | | |
|---|---|---|
| *H04N 19/31* | (2014.01) | |
| *H04N 11/02* | (2006.01) | |
| *H04N 7/12* | (2006.01) | |
| *H04N 19/159* | (2014.01) | |
| *H04N 19/187* | (2014.01) | |
| *H04N 19/172* | (2014.01) | |
| *H04N 5/232* | (2006.01) | |
| *H04N 19/124* | (2014.01) | |
| *H04N 19/132* | (2014.01) | |
| *H04N 19/30* | (2014.01) | |
| *H04N 19/59* | (2014.01) | |

(52) U.S. Cl.
CPC ......... *H04N 19/31* (2014.11); *H04N 5/23232* (2013.01); *H04N 5/23241* (2013.01); *H04N 5/23245* (2013.01); *H04N 19/124* (2014.11); *H04N 19/132* (2014.11); *H04N 19/159* (2014.11); *H04N 19/172* (2014.11); *H04N 19/187* (2014.11); *H04N 19/30* (2014.11); *H04N 19/59* (2014.11)

(58) Field of Classification Search
CPC .. H04N 19/124; H04N 19/132; H04N 19/159; H04N 19/172; H04N 19/187; H04N 19/30; H04N 19/31; H04N 19/59; H04N 5/23232; H04N 5/23241; H04N 5/23245
See application file for complete search history.

(56) References Cited

U.S. PATENT DOCUMENTS

| | | | | |
|---|---|---|---|---|
| 2005/0074177 | A1* | 4/2005 | Ichimura | H04N 19/61 382/240 |
| 2006/0165179 | A1* | 7/2006 | Feuer | H04N 7/01 375/240.18 |

(Continued)

*Primary Examiner* — Jessica E Prince
(74) *Attorney, Agent, or Firm* — Hanley, Flight & Zimmerman, LLC

(57) ABSTRACT

An adaptive camera resolution system is described for use with matching resolution with compression. In one example, the a method includes capturing a first set of frames of a video sequence at an image sensor at a first resolution, capturing a second set of frames of the video sequence at the image sensor at a second lower resolution, wherein the first and second sets of frames are interleaved, receiving the captured frames at a video encoder, and combining the frames at the video encoder to generate an encoded video sequence of frames with the first resolution.

14 Claims, 4 Drawing Sheets

(56) References Cited

U.S. PATENT DOCUMENTS

| | | | | |
|---|---|---|---|---|
| 2006/0268300 A1* | 11/2006 | Suzuki | ................ | H04N 19/156 |
| | | | | 358/1.9 |
| 2008/0309778 A1* | 12/2008 | Tabatabai | ............. | H04N 5/2628 |
| | | | | 348/222.1 |
| 2011/0050935 A1* | 3/2011 | Mukherjee | ........... | H04N 19/597 |
| | | | | 348/222.1 |
| 2011/0052095 A1* | 3/2011 | Deever | ................ | H04N 9/045 |
| | | | | 382/300 |
| 2015/0296119 A1* | 10/2015 | Iwasaki | ................ | H04N 5/772 |
| | | | | 348/211.3 |
| 2016/0366414 A1* | 12/2016 | Zhang | ................ | H04N 19/184 |

* cited by examiner

ADAPTIVE CAMERA RESOLUTION FOR COMPRESSION MATCHING

CROSS-REFERENCE TO RELATED APPLICATION

The present application is a nonprovisional of prior U.S. Patent Application Ser. No. 62/334,836, filed May 11, 2016, entitled "ADAPTIVE CAMERA RESOLUTION FOR COMPRESSION MATCHING," by Richmond Hicks, et al., the priority of which is hereby claimed and the contents of which are hereby incorporated by reference herein.

FIELD

The present description relates to the field of video compression and, in particular, to matching camera resolution to the compression.

BACKGROUND

Traditional digital cameras capture videos at uniform resolution and frame rate. Modern video encoders encode video frames using different frame types, e.g. I, P and B frames, and using a temporal prediction hierarchy, with frames at higher levels of the prediction hierarchy encoded at lower bitrates and lower quality levels.

High resolution and frame rate capture in mobile devices is currently limited by power consumption because the performance of image sensors degrade with increased temperature. Capturing all frames at full resolution regardless of the needs of the encoding engine increases the temperature of the sensor and wastes power as more pixels are converted than are required.

Images generated by modern sensors and cameras require significant post processing prior to the encode process. Processing images at higher than required resolution also uses unnecessary power, which can be critical in battery operated or thermally limited systems.

BRIEF DESCRIPTION OF THE DRAWING FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity.

DETAILED DESCRIPTION

Figure 1:
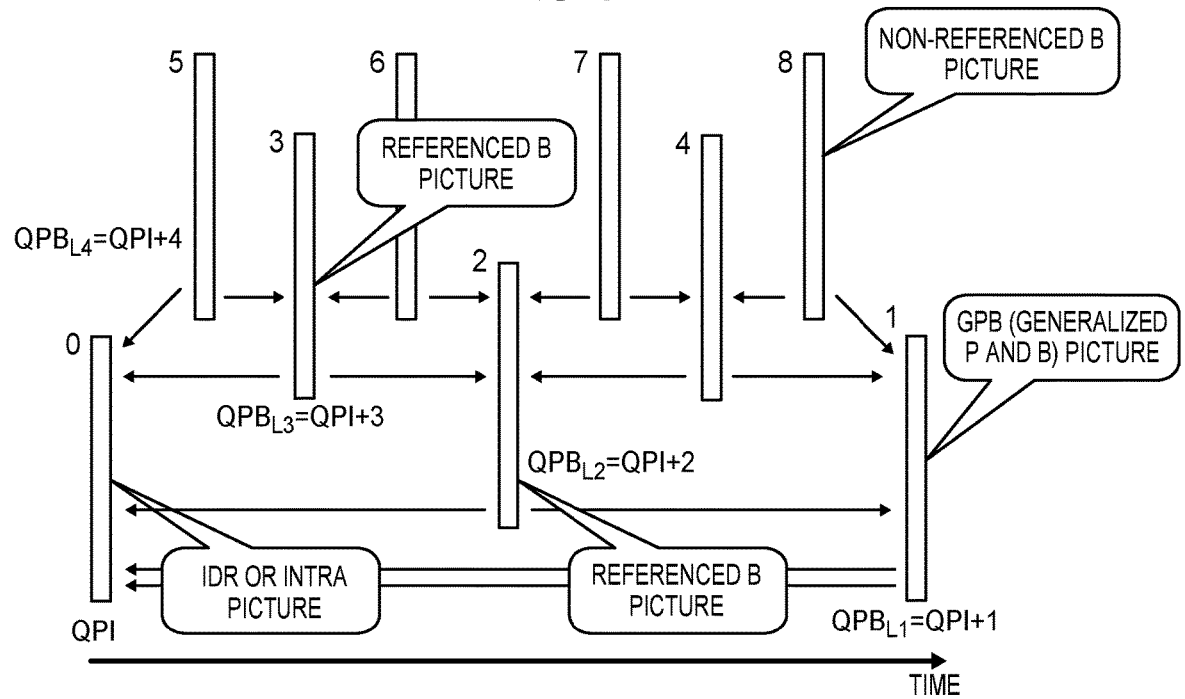
FIG. 1 is a block diagram of a temporal prediction hierarchy suitable for use with embodiment of the invention.

As described herein, the camera capture parameters may be synchronized to the resolution needs of the encoding engine. To do so, the camera is configured to deliver frames that are to be encoded at the lowest prediction hierarchy level at full resolution and then at lower resolutions for the frames that are to be encoded at higher levels in the prediction hierarchy.

To control the frame resolution, the compression engine may be tightly coupled with the camera driver. This is feasible in modern processors that include specialized ISP (Image Signal Processor) engines and tight coupling of camera control. When the camera runs independently from the encoding process, then the camera runs at the maximum resolution required for I-frames (or the equivalent highest resolution required for the video encoding). This ensures that the resolution is always available to the encoder when needed for a new I frame. While some encoding systems will adapt the encoded frame rate and resolution based on the quality of the channel, this adaptation is applied in post processing and not in the camera, which continues to capture at the highest resolution and frame rate. As a result a camera system with an 8MP sensor, which is sufficient for 4K video resolution, will continue to capture at full resolution while the channel may be limited to transmitting 1080p video, equivalent to a 2MP sensor. The reduced video capture resolution reduces the load on the image sensor, buffers, signal processors, and other components.

By coupling the compression engine and the camera driver, thereby reducing the resolution captured by the camera for many of the frames, similar power savings as in the encoding system are obtained at the image sensor for a given channel quality (compression ratio) without sacrificing the end-end image quality.

When the camera capture resolution is reduced, then the pixel ADC (Analog to Digital Conversion) and post processing power consumption in the image sensor is also reduced. This enables higher resolution for the frames that benefit from higher resolution or higher frame rate sensors, or improved battery life. This savings can be in the range of a few hundred milliwatts for some compact integrated portable cameras.

When the resolution of the camera capture is reduced, then the computational requirements of the Image System Processor (ISP) are reduced, reducing the power needed for this chip, component, or function. This can either improve battery life, or enable higher resolution recording in thermally limited platforms (e.g. UHD (Ultra High Definition) may be recorded using the power normal for recording FHD (Full High Definition)).

Tight coupling between the encoding process and the camera control process may be used to align the capture resolution with the quality level of the video encoding temporal prediction hierarchy. This can allow a camera system to operate at a higher frame rate, higher resolution, lower power, or some combination than might otherwise be possible.

FIG. 1 is a diagram of a temporal prediction hierarchy used in the HEVC reference software encoder for a group of pictures as defined by the JCTVC (Joint Collaborative Team on Video Coding). A sequence of frames of a video sequence is captured over time from left to right. The first frame is an IDR (Instantaneous Decoding Refresh), Intra Picture or I frame indicated as frame 0. This is followed by B frames, indicated as frames 2-8, and one P frame indicated as frame 1. The number of frames of each type is determined by the video encoder. The hierarchy level is shown vertically. Non-referenced B pictures or frames 5, 6, 7, 8 are at the top of the hierarchy. Referenced B pictures 3, 4, are at a next lower hierarchy and another referenced B picture 2 is at a lower hierarchy. A generalized P and B (GPB) picture 1 is at the lowest hierarchy like the I picture 0.

Frames at the lowest levels of the hierarchy are coded with the lowest values of QP (Quantization Parameter), the default Quantization Parameter for the frame, resulting in higher bitrates and higher quality levels. Pictures at lower layers of the hierarchy are used as references for temporal prediction of more of the other frames in the group of pictures, and hence benefit more from a higher level of video quality.

I frames (Intra Frames or Intra Pictures) are included in the lowest layer of the hierarchy and have the lowest value of QP, indicated in the diagram as QPI. At each successive level of hierarchy, the value of QP is increased resulting in lower bitrate and lower quality, as the coded frames are used less often as references. At the highest level of the hierarchy are non-referenced B frames (Bi-predictive inter frames), which are not used as references by any other frames in the group of pictures, and have the highest QP value. P frames (predictive inter frames) which reference only earlier frames stand between the highest and lowest levels of the hierarchy. For this illustrated example containing 4 levels of hierarchy, the QP value of the 4 level pictures, QPBL4, is equal to QPI+4.

The value of QP of an encoded video frame adjusts the step size used by the quantizer in the video encoder. Larger step sizes result in lower video quality, and lower bitrates. Frames encoded with large values of QP lose high spatial frequency information during the encoding process. High spatial frequency information being the chief benefit of capturing at higher pixel resolution, this implies that unnecessary information has been captured and later discarded.

The resolution needs of the encoding function, as based on the QP value of the frame according to temporal hierarchy level and/or frame type of the frame to be encoded, are determined by the encoder. By coupling these to the pixel resolution captured in the image sensor, the capture of unnecessary information is avoided. Frames encoded with higher QP values and hence lower quality levels may be captured at lower resolutions than frames encoded at lower QP values. As a result, there is not unnecessary information and there is no information that is discarded.

For example, for the above temporal prediction hierarchy of FIG. 1, the frames labeled 0, 1, and 2, corresponding to the two lowest hierarchy levels may be captured at the full resolution, while the frames labeled 3 through 8 may be captured at ¼ of the full resolution, by halving the resolution in each dimension. Other ratios of resolution reduction for higher levels may alternatively be used.

The frames captured at lower resolutions may be upsampled to the full resolution, before or as part of the encoding process. These frames will contain less high spatial frequency information than frames that had originally been captured at the full resolution. Because the quantization process using a high value of QP would have lost much of the high spatial frequency information anyway, the impact on the overall encoded video quality is minimal, if any.

Figure 2:
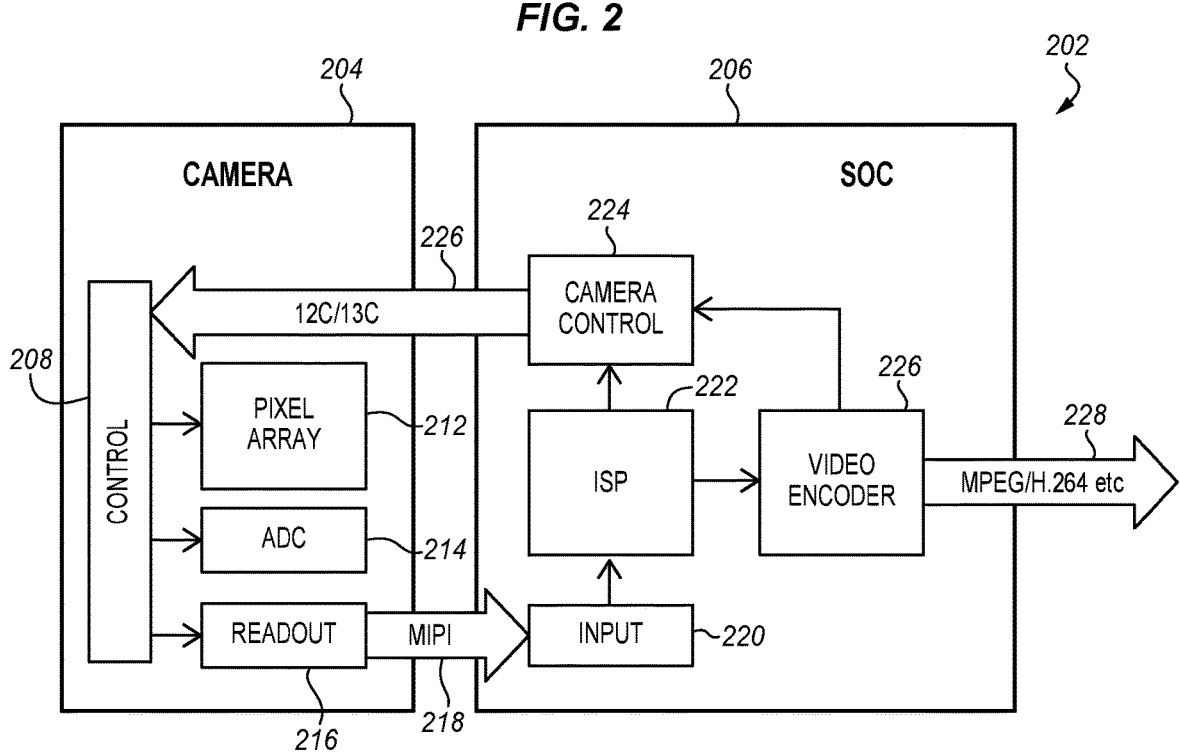
FIG. 2 is a block diagram of an example video capture and encoding system according to an embodiment.

FIG. 2 is a functional block diagram of a mobile camera system, tablet, smart phone, or video recorder 202. It shows how fine-grained control of the sensor resolution can be implemented using Intel or other processors. This is one example of a camera system. The techniques described herein may be adapted to other systems.

The camera 204 has a pixel array of sensors 212, an ADC 214, and a readout interface 216 that is connected 218 to an SOC (System on a Chip) 206. These are all connected to and controlled by control logic 208 that is connected to the SOC 206 using a control bus 226 such as I2C/3C. The SOC has a camera controller 224 connected to the controller 208 in the camera 204 using the control bus 226. The SOC also has an image input interface 220 to receive the camera readout 216 from the camera using, for example a MIN (Mobile Industry Processor Interface) bus 218. The camera control, and image input interface are coupled to an ISP 222 on the SOC. The ISP is coupled to a video encoder 226 that produces an MPEG, H.264, H.265, HEVC or other video output format 228. The encoder is coupled to the controller in the camera through the ISP or through the camera controller 224 in the SOC.

The input image interface 220 may receive images from other cameras and other sensors of a device (not shown) and the SOC may have other components (not shown). These components may include processors, audio mixers and encoders, communication interfaces, display interfaces, graphics processors, etc.

The camera includes control logic 208 that selects which pixels are exposed and read out. In this system, the control logic includes multiple settings that enable fast frame by frame setting switching. This enables capturing, for example, every 4th or 8th frame at full resolution and using 2:1 binning or skipping on the remaining frames. In addition to reducing the amount of data to be converted in the ADC block, which saves power, binning improves the signal to noise as the pixels are summed prior to adding the quantization noise of the ADC process. The controller marks the frames using embedded data.

On the SOC side, the input interface controller checks the frame markings and stores them for processing by the ISP. The ISP checks the markings and decodes the resolution of the frames correctly and processes the image at the captured resolution. At the end of the capture process, to ease implementation of the video encoder, the ISP can upscale the reduced resolution frames prior to sending to the video encoder. Alternatively, the video encoder can be configured to handle the multiple resolutions. In either case, the video encoder is synchronized to the video frames such that the highest resolution frames are used to generate the frames that are to be sent with the highest image quality.

The image traffic across the MIPI (Mobile Industry Processor Interface) bus between the camera and the SOC shows that the resolution changes with different frames. This resolution interleaving will change based on the channel quality and with the quality and type of video compression that is being used by the video encoder. The QP values of the encoded frames will be reflected in the compressed video bitstream headers that are applied by the ISP to the frames that are sent to the video encoder.

In some embodiments, the cooperation of the ISP and camera may be done without affecting the video encoder. The cooperation may be executed using a camera driver in the ISP or using firmware. In such a case, no change is required to the operating system or any imaging applications. The usage of the device is unaffected and the improved capture efficiency is transparent to the user of the encoded video. In one example, the ISP is directed by the system to align with the encoder's known prediction hierarchy. The encoder will then have the appropriate frame type for its prediction process. The encoder itself can be unaware that it is being provided with just what it needs.

Alternatively, the encoder will set a parameter or send a command to the camera to indicate a ratio of the high to low (and perhaps medium) resolution frames that it needs and then the camera will generate this sequence in a loop. The encoder then uses the frames based on the provided ratio. This ratio is dependent on the channel quality and not dependent on the scene. In another example, the frames are captured according to a pattern that is known to the encoder, such as every third frame is high resolution. The encoder selects only from every third frame when selecting a frame to use as a reference frame. In this case, the ratio is fixed or set to a default value that may be changed by the encoder. In another example, the camera captures frames with a particular ratio that is not based on instructions from the encoder and then labels the high resolution frames. The encoder selects from among the high resolution frames for use as the reference or I frames.

The described techniques provide improved power and performance for video recording and video conferencing. This may lead to improved experiences such as higher resolution in small form factors, longer battery life, and reduced operating temperatures which provide improved user comfort and longer service life.

Figure 3:
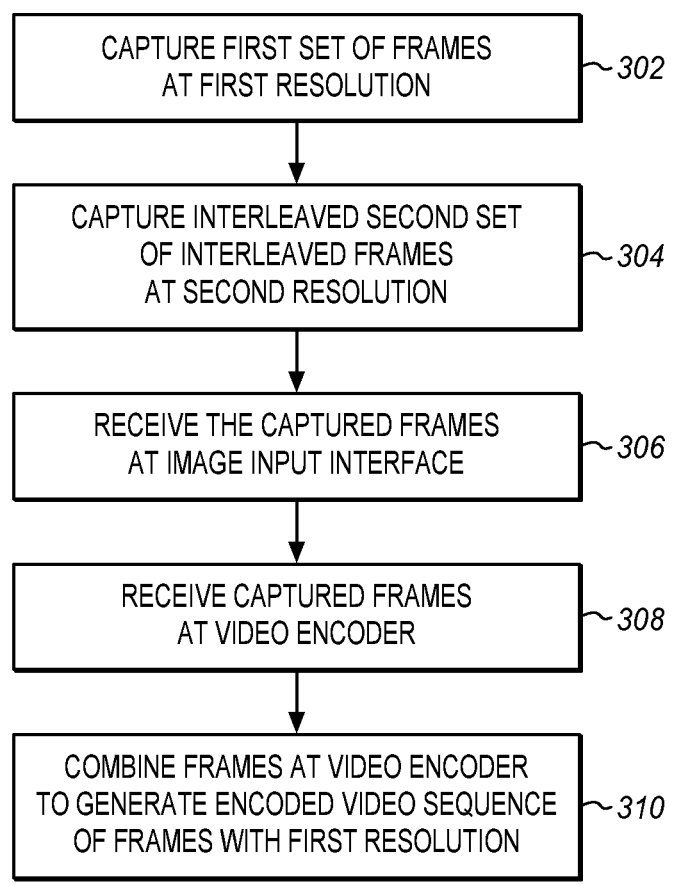
FIG. 3 is a process flow diagram of capturing and encoding video according to an embodiment.

The operation of the camera and encoding system in the figure above may be described as a sequence of operation as shown in the process flow diagram of FIG. 3. At 302 the image sensor of the camera captures a first set of frames of a video sequence at a first resolution. These frames may be used for I frames, for example. At 304 the images sensor captures a second set of frames of the video sequence at a second lower resolution. These frames may be used for P and B frames for example, or for other frames that are higher in the prediction hierarchy of a video encoder. The particular names and designations and hierarchy may vary depending on the particular video encoder.

As described above, the I frame capture is interleaved with the P and B frame capture. The interleaving and the number of each of the two types of frames may be set according to a convention used by the video encoder or it may vary depending on the particular types of scenes and encoding that is to be used. Every third frame may be high resolution, or some other number may be used. Alternatively the camera controller 224 may send a signal to the camera to capture a high resolution frame on demand. There may also be a sequence of high resolution frames followed by a sequence of lower resolution frames, such as 5 high resolution frames followed by 15 low resolution frames.

While examples are provided with one resolution for I frames and a lower resolution for P and B frames. Three or more different resolutions may be used. As shown in FIG. 1, HEVC uses referenced and non-referenced B frames. The non-referenced B frames are higher in the hierarchy and may be captured at a still lower resolution than the referenced B frames without significantly affecting the encoded video. Other video encoding schemes may have more or fewer hierarchical layers and may be adapted to used different resolutions accordingly.

At 306 the captured frames are received, for example, at an image input interface. This interface may include a buffer. At 308 the captured frames are received at a video encoder and at 310, the frames are combined at the video encoder to generate an encoded video sequence of frames with the first resolution.

The resolution of the captured frames may be modified in a variety of different ways. In some embodiments, the frames may alternate between full and reduced resolution. The frames are tagged by the camera capture controller or the ADC or the readout module and then the encoder uses the full resolution frames when full resolution is required. Similarly there may be two, three, four or some other number of reduced resolution frames for each full resolution frame. In another embodiment, the encoder or the ISP provides specific instructions to the camera capture controller for each frame or for only the full resolution frames. The camera capture controller then sets the image sensor and processes the output data accordingly.

An image processor or the video encoder may upscale the second set of frames to the first resolution after capturing the frames and before combining the frames in the video encoder. The image processor may also convert frames to YUV images before combining the frames in the video encoder. The captured frames at the image input interface may first be provided to the ISP before being provided to the encoder for upscaling and other processing.

This process may be performed using the system hardware by sending an indication of the desired resolution from the video encoder to a camera controller where the camera controller sets the resolution for captured images. Sending the instruction may be performed by receiving an instruction from an application at an image signal processor, configuring the video encoder, and configuring the camera controller. The camera controller may be configured by sending instructions from the video encoder to a camera driver through the image signal processor and the control bus, such as the I2C bus described above.

In some embodiments, the camera control module or camera capture controller 208 generates reset and read signals for the pixel array 212. The pixel array is reset and read out on a row by row basis to the array of Analog to Digital Converters 214 that generate a digital value that is proportional to the amount of light that is falling on the pixel. To provide a full resolution frame, the controller 208 scans through all the lines of the pixel array in sequence and the ADC array converts all the pixels in each row.

To deliver a reduced resolution, the controller can skip lines which saves the energy associated with resetting and reading these lines. In addition, the ADC can be configured to convert a sub-set of the columns into digital values, reducing the number of active ADC's. In other words, the sample and hold circuits are disabled or shut down for some of the rows of sensors in the sensor array, for example ever other or every two out of three rows. The ADC's are similarly disabled for some of the columns, for example, the ADC convert only every other or every third sensor output from the sample and hold circuitry of the pixel array. The reduced number of sensors or columns combined with the reduced number of rows to be converted, provides a significant power and heat savings in the ADC block.

By configuring the controller to automatically sequence between full and reduced resolution frames, the image quality needs of the encoding process may be met with a substantial (60%) reduction in sensor power. By reducing the full resolution frames to one in 3 or one in 4, even greater savings may be realized.

In the present invention, the encoder uses a combination of full resolution and partial or lower resolution frames. The lower resolution frames may be upscaled to have the same number of pixels even if the pixels contain less scene information in aggregate. As described above, the different resolutions may be based on the camera capturing differing levels of resolutions based on a pattern or on the needs of the encoder in the encoding process.

In order to simplify the sensor operation, the camera 204 may instead deliver only full resolution frames to the SOC 206. The image input module 220 or the ISP 222 may then reduce the resolution of some of the frames based on a pattern or knowledge of the needs of the encoding process. While the camera will use the same amount of power as with normal full resolution video capture, the ISP will save power which may be on the order of a few hundred milliwatts to ½ watt. Only the SOC's input is modified.

There are a variety of different ways to reduce the resolution of some of the frames of the video. The ISP might simply delete every other pixel value in each row and each column turning a 1920×1080 frame into a 960×540 frame. Other values may be used such as deleting two out of three or three out of four to further reduce the amount of information. This work may also be done at the camera 204, such as at the camera capture controller or the ADC. For better results, the ISP may apply filtering techniques to maintain edge details or high contrast areas which may be blurred or removed by simply deleting pixels.

Figure 4:
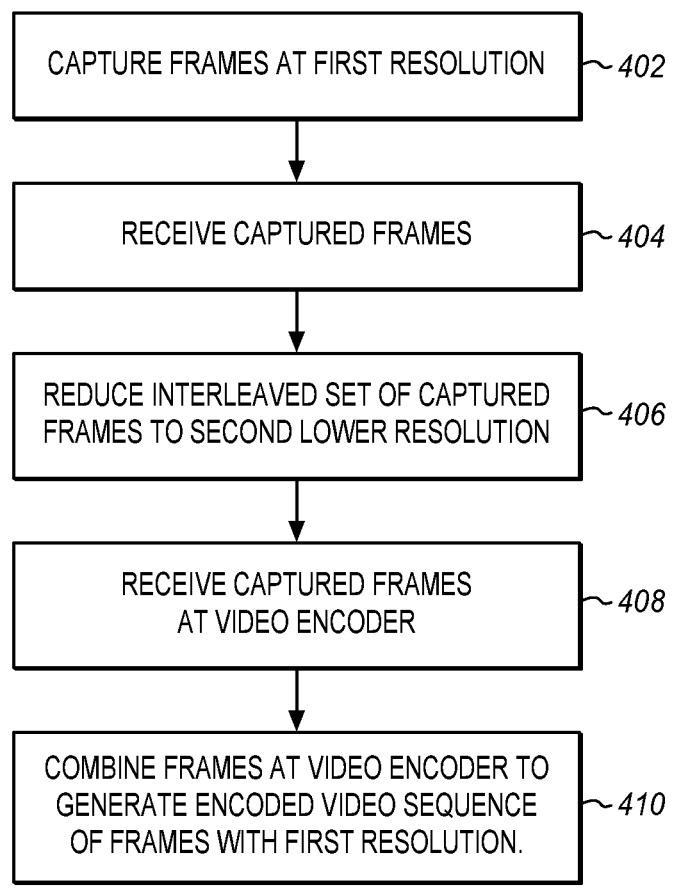
FIG. 4 is another process flow diagram of capturing and encoding video according to an embodiment.

This operation of the camera and encoding system may also be applied to the example hardware figure above and may be described as a different sequence of operations. FIG. 4 is an alternative process flow diagram of using frames at a lower resolution to support video encoding. At 402 frames of a video sequence are captured at a first resolution at an image sensor. As compared to the example of FIG. 3, in this example, all images are captured at the same image resolution. At 404 the captured frames are received and buffered, for example at an image input interface.

At 406 the resolution of a set of the captured frames of the video sequence is reduced to a second lower resolution, for example for P and B frames, or for frames that are higher in the prediction hierarchy. This set of frames is interleaved with the frames that remain at the original resolution. The resolution reduction may be performed in an ISP or in the input system or in another resource. The resolution reduction may be performed in any of a variety of different ways using an image signal processor, a graphics processor or another compute resource. In one example, the captured frames are received in the image or graphics processor at the first resolution and buffered. A Bayer down scaler is then applied to the raw full resolution image data to produce the second resolution frames or, in other words, to convert some of the frames from the first full resolution to the second lower resolution.

At 408 the captured frames are received at the video encoder. These captured frames include higher and lower resolution and are interleaved. They may be identified as lower and higher resolution by a header or there may be another technique to distinguish them, such as position within the frame sequence. At 410 the frames of both resolutions are encoded at the video encoder to generate an encoded video sequence of frames with the first resolution.

Figure 5:
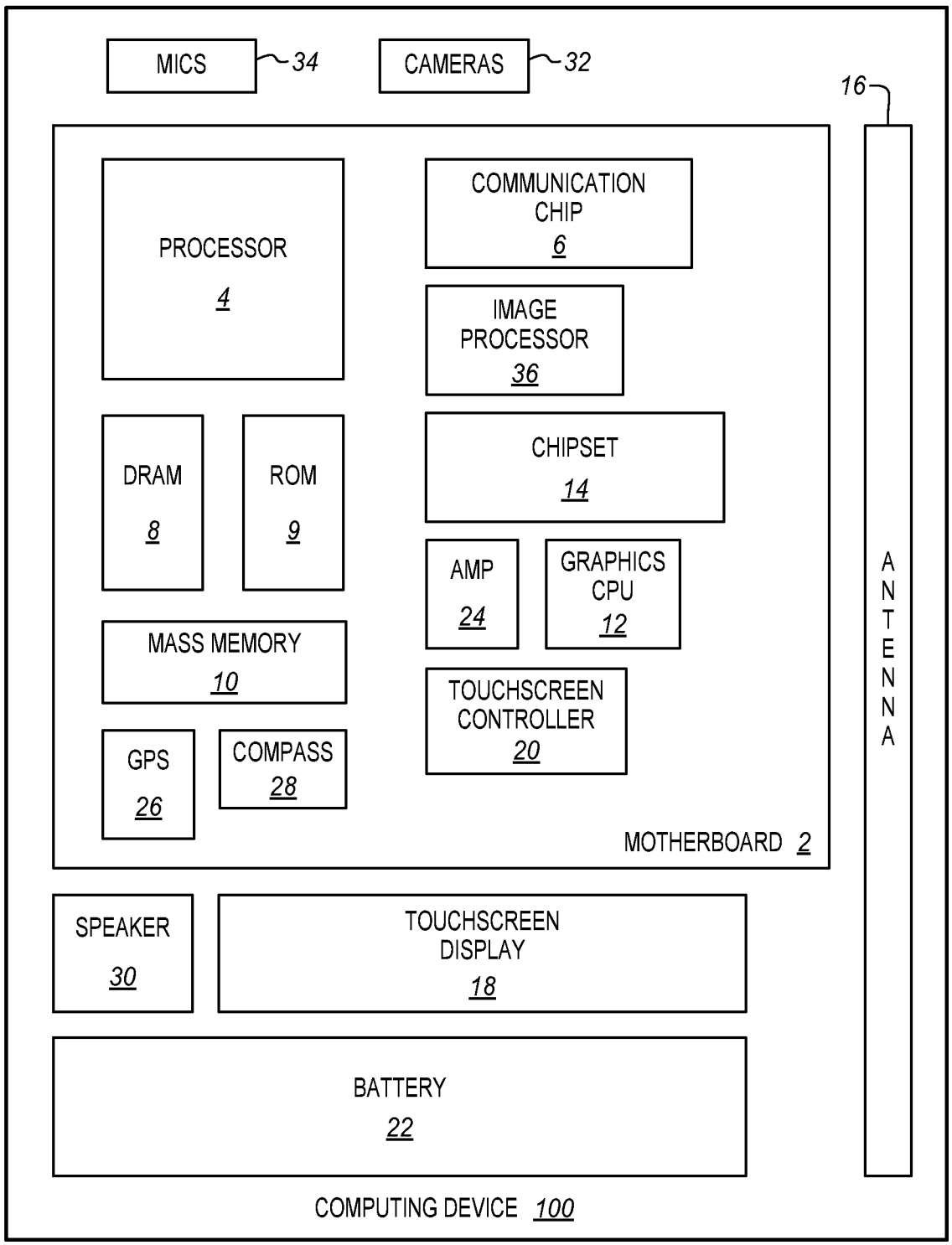
FIG. 5 is a block diagram of a computing device suitable for video capture and encoding according to an embodiment.

FIG. 5 is a block diagram of a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 contain image sensors with pixel arrays, controllers, and readouts as described herein. The image sensors may use the resources of an image processing chip 3 to read values and also to perform format conversion, coding and decoding, noise reduction and 3D mapping, etc. The processor 4 is coupled to the image processing chip to drive the processes, set parameters, etc. All of these components may be incorporated into a SOC or fabricated as one or more different chips connected together. The I2C/I3C and MIPI interfaces may be through the system board or through another medium.

In various implementations, the computing device 100 may be eyewear, a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims. The various features of the different embodiments may be variously combined with some features included and others excluded to suit a variety of different applications.

Some embodiments pertain to a method that includes receiving captured frames at a first resolution from an image sensor, reducing a set of the captured frames of the video sequence to a second lower resolution, wherein the second resolution frames are interleaved with the first resolution frames in the video sequence, buffering the interleaved video sequence, receiving the interleaved video sequence at a video encoder, and combining the frames of the interleaved video sequence at the video encoder to generate an encoded video sequence of frames with the first resolution.

In further embodiments the second resolution frames are encoded as frames that are higher in the prediction hierarchy of the video encoder than the first resolution frames.

In further embodiments reducing comprises receiving the captured frames at the first resolution at an image signal processor and deleting pixels of the frames to produce the second resolution frames.

In further embodiments reducing comprises receiving the captured frames at the first resolution at an image signal processor and applying a Bayer down scaler to the raw data to produce the second resolution frames.

Some embodiments pertain to a method that includes capturing a first set of frames of a video sequence at an image sensor at a first resolution, capturing a second set of frames of the video sequence at the image sensor at a second lower resolution, wherein the first and second sets of frames are interleaved, receiving the captured frames at a video encoder; and combining the frames at the video encoder to generate an encoded video sequence of frames with the first resolution.

In further embodiments capturing the first set of frames comprises capturing I frames of the video sequence, and capturing the second set of frames comprises capturing B frames of the video sequence.

Further embodiments include capturing P frames of the scene at the image sensor after capturing at least one I frame using a third resolution lower than the first resolution.

In further embodiments the second and third resolution is the same and is one fourth of the first resolution.

In further embodiments capturing the B frames comprises capturing referenced B frames at the second resolution and capturing non-referenced B frames at a fourth resolution lower than the second resolution.

Further embodiments include upscaling the second set of frames to the first resolution at an image signal processor after capturing and before combining the frames in the video encoder.

Further embodiments include converting the upscaled images to YUV images at the image signal processor before combining the frames in the video encoder.

Further embodiments include sending an indication of a desired capture resolution from the video encoder to a camera controller and wherein the camera controller sets the resolution at the image sensor for captured images.

In further embodiments sending an instruction comprises receiving an instruction from an application at an image signal processor, configuring the video encoder, and configuring the camera controller.

In further embodiments configuring the camera controller comprises sending instructions from the video encoder to a camera driver through the image signal processor.

Some embodiments pertain to an apparatus that includes an image sensor to capture a first set of frames of a video sequence at a first resolution and to capture a second set of frames of the video sequence at a second lower resolution, wherein the first and second sets of frames are interleaved, an image input interface to receive the captured frames from the image sensor, a video encoder to receive the captured frames from the image input interface and to combine the frames to generate an encoded video sequence of frames with the first resolution.

Further embodiments include a camera capture controller coupled to the video encoder to receive instructions from the video encoder to set the image sensor to capture at the first and the second resolutions.

Further embodiments include an image signal processor coupled to the video encoder to upsample the second set of frames to the first resolution after they are captured.

Some embodiments pertain to a computing device that includes a display to show an encoded video, an image sensor to capture a first set of frames of a video sequence at a first resolution and to capture a second set of frames of the video sequence at a second lower resolution, wherein the first and second sets of frames are interleaved, an image input interface to receive the captured frames from the image sensor, and a video encoder to receive the captured frames from the image input interface and to combine the frames to generate the encoded video as a sequence of frames with the first resolution to show on the display.

In further embodiments the video encoder is a High Efficiency Video Coded (HEVC) and wherein the first set of frames are capturing I frames of the video sequence and the second set of frames comprise B frames of the video sequence.

Further embodiments include a control bus from the video encoder to the image sensor and wherein the video encoder controls the resolution used to capture the frames of the video sequence.

What is claimed is:

1. A method comprising:
capturing a first set of frames, including I frames, of a video sequence at an image sensor at a first resolution;
capturing a second set of frames of the video sequence at the image sensor including capturing referenced B frames at a second resolution lower than the first resolution and capturing non-referenced B frames at a resolution lower than the second resolution, wherein the first set of frames and the second set of frames are interleaved;
receiving the captured first set of frames and the second set of frames at a video encoder; and
combining the first set of frames and the second set of frames at the video encoder to generate an encoded video sequence of frames with the first resolution.

2. The method of claim 1, further comprising capturing P frames of the scene at the image sensor after capturing at least one I frame using a third resolution lower than the first resolution.

3. The method of claim 2, wherein the second and third resolution is the same and is one fourth of the first resolution.

4. The method of claim 1, further comprising upscaling the second set of frames to the first resolution at an image signal processor after capturing and before combining the frames in the video encoder.

5. The method of claim 4, further comprising converting the upscaled images to YUV images at the image signal processor before combining the frames in the video encoder.

6. The method of claim 1, further comprising sending an indication of a desired capture resolution from the video encoder to a camera controller and wherein the camera controller sets the resolution at the image sensor for captured images.

7. The method of claim 6, wherein the sending of the indication includes receiving an instruction from an application at an image signal processor, configuring the video encoder, and configuring the camera controller.

8. The method of claim 7, wherein the configuring of the camera controller includes sending instructions from the video encoder to a camera driver through the image signal processor.

9. An apparatus comprising:
an image sensor to capture a first set of frames, including I frames, of a video sequence at a first resolution and to capture a second set of frames of the video sequence including capturing referenced B frames at a second resolution lower than the first resolution and capturing non-referenced B frames at a resolution lower than the second resolution, wherein the first set of frames and the second set of frames are interleaved;
an image input interface to receive the captured first set of frames and second set of frames from the image sensor; and
a video encoder to receive the captured first set of frames and second set of frames from the image input interface and to combine the frames to generate an encoded video sequence of frames with the first resolution.

10. The apparatus of claim 9, further comprising a camera capture controller coupled to the video encoder to receive instructions from the video encoder to set the image sensor to capture at the first and the second resolutions.

11. The apparatus of claim 9, further comprising an image signal processor coupled to the video encoder to upsample the second set of frames to the first resolution after they are captured.

12. A portable device comprising:
a display to show an encoded video;
an image sensor to capture a first set of frames, including I frames, of a video sequence at a first resolution and to capture a second set of frames of the video sequence including capturing referenced B frames at a second resolution, lower than the first resolution and capturing non-referenced B-frames at a resolution lower than the second resolution, wherein the first set of frames and the second set of frames are interleaved;
an image input interface to receive the captured first set of frames and second set of frames from the image sensor; and
a video encoder to receive the captured first set of frames and second set of frames from the image input interface and to combine the frames to generate the encoded video as a sequence of frames with the first resolution to show on the display.

13. The device of claim 12, wherein the video encoder is a High Efficiency Video Coded (HEVC).

14. The device of claim 13, further comprising a control bus from the video encoder to the image sensor and wherein the video encoder controls the resolution used to capture the frames of the video sequence.

* * * * *